US012665253B2

(12) United States Patent
Hoglund et al.

(10) Patent No.: US 12,665,253 B2
(45) Date of Patent: Jun. 23, 2026

(54) BATTERY ALIGNMENT SYSTEM FOR A CAMERA

(71) Applicant: MOTOROLA SOLUTIONS, INC., Chicago, IL (US)

(72) Inventors: James Hoglund, Dallas, TX (US); James Dulaney, Princeton, TX (US); Brian Mooney, Plano, TX (US); Chi T. Tran, Naperville, IL (US); Daniel Wodarcyk, Park Ridge, IL (US); Michael Wuensch, Carrollton, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 893 days.

(21) Appl. No.: 17/811,952

(22) Filed: Jul. 12, 2022

(65) Prior Publication Data

US 2024/0021949 A1 Jan. 18, 2024

(51) Int. Cl.
*H01M 50/291* (2021.01)
*H01M 50/244* (2021.01)
*H01M 50/247* (2021.01)
*H01M 50/262* (2021.01)

(52) U.S. Cl.
CPC ....... *H01M 50/291* (2021.01); *H01M 50/244* (2021.01); *H01M 50/247* (2021.01); *H01M 50/262* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 5,308,716 A | | 5/1994 | Shababy et al. |
| 7,659,694 B2 | | 2/2010 | Griffin |
| 8,534,717 B2 | | 9/2013 | Whetten et al. |
| 9,972,812 B1 * | | 5/2018 | Motoyama .......... H01M 50/296 |
| 2005/0225296 A1 * | | 10/2005 | Tashiro ............... H02J 7/00047 |
| | | | 320/134 |
| 2018/0353036 A1 | | 12/2018 | Gierer |
| 2020/0280033 A1 | | 9/2020 | Radovich et al. |

(Continued)

OTHER PUBLICATIONS

Motorola Solutions, Inc., "V300 Police Body Camera," <https://www.motorolasolutions.com/en_us/video-security-access-control/body-worn-cameras/v300.html?utm_medium=cpc&utm_source=google&utm_campaign=na_q421_vsa_dc_law_lc_interactive_mic_sem_vsa&gclid=Cj0KCQjw1ZeUBhDyARIsAOzAqQL-IJRWG9kozgpmhg7INic4-0w1jLTeUv6dnzARoAcJpj18icijITAaAkeKEALw_wcB#>, published at least as early as Jan. 21, 2021, (3 pages).

(Continued)

*Primary Examiner* — Haroon S. Sheikh
(74) *Attorney, Agent, or Firm* — Michael Best & Friedrich LLP

(57) ABSTRACT

A battery alignment system includes a housing having a groove along a side of the housing, a first set of surfaces that define a recess, and first electrical contacts positioned at least partially within the recess. The battery alignment system also includes a battery having a tab to slide within the groove of the housing to facilitate a first alignment, a second set of surfaces that protrude from an end of the battery to slide into the recess of the housing to facilitate a second alignment, and a third surface that extends from one of the second set of surfaces. The third surface engages one of the first set of surfaces to facilitate a third alignment. The battery also includes second electrical contacts that engage the first electrical contacts.

17 Claims, 5 Drawing Sheets

(56) References Cited

U.S. PATENT DOCUMENTS

2020/0358052 A1*  11/2020  Motoyama .......... H01M 50/296
2024/0186634 A1*   6/2024  Huang  ................ H01M 50/588

OTHER PUBLICATIONS

Photo of XTS2500 bottom-tab and rotate in oval battery alignment
feature using a sliding alignment feature, photo taken prior to Apr.
11, 2022, (2 pages).
Photo of APX3000 battery retention feature, photo taken prior to
Apr. 11, 2022, (2 pages).
Photo of Moto Turbo battery retention feature, photo taken prior to
Apr. 11, 2022, (2 pages).
Photo of MSI Visar Two-Way Radio battery retention feature, photo
taken prior to Apr. 11, 2022, (2 pages).
Motorola Solutions, Inc., "Impres 2 Batteries," <https://www.
motorolasolutions.com/en_us/products/two-way-radio-accessories/
batteries/impres2-batteries.html> published at least as early as May
5, 2022 (3 pages).
International Invitation to Pay Additional Fees and, Where Appli-
cable, Protest Fees for Application No. PCT/US2023/069390, dated
Oct. 20, 2023 (7 pages).
International Search Report and Written Opinion for Application
No. PCT/US2023/069390 dated Dec. 11, 2023 (15 pages).
Examination Report No. 1 issued by the Australian Government for
Application No. 2023307687 dated Dec. 8, 2025 (5 pages).

* cited by examiner

BATTERY ALIGNMENT SYSTEM FOR A CAMERA

BACKGROUND OF THE INVENTION

Cameras, including body cameras worn by emergency medical services (EMS) responders, commonly include a camera housing and a battery that is releasably coupled to the camera housing. One of the key features, and selling points, of current body cameras is a battery that can be swapped quickly in the field. This supports EMS responders who need to be on site much longer than the capacity, or life, of a single battery.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments, examples, and aspects.

Figures 1, 2:
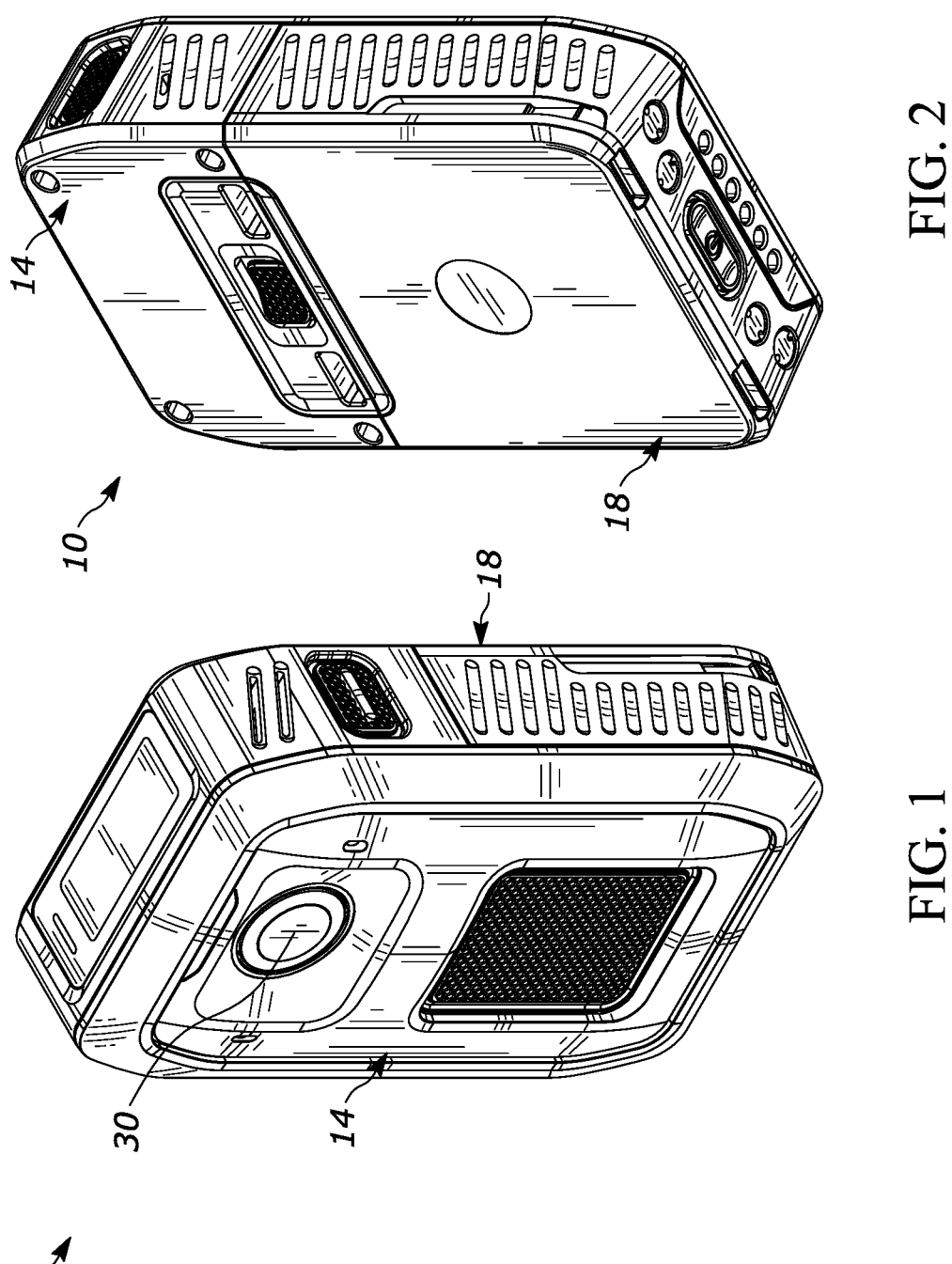
FIG. 1 is a front perspective view of a camera having a battery alignment system in accordance with one example.
FIG. 2 is a rear perspective view of the camera.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, and aspects, and features.

The apparatus and method components have been represented where appropriate by conventional symbols in the drawings, showing only those specific details that are pertinent to understanding various embodiments, examples, aspects, and features so as not to obscure the disclosure with details that will be readily apparent to those of ordinary skill in the art having the benefit of the description herein.

DETAILED DESCRIPTION OF THE INVENTION

As noted above, it is important that body cameras include a battery that can be swapped quickly in the field, in the event an EMS responder is in the field for longer than the capacity, or life, of one battery. It is also important that the connectors on the batteries quickly and easily align with the connectors on the camera housing, to facilitate ease of swapping one battery for another, and to prevent damage to the battery and/or camera housing. Additionally, it is important that the batteries themselves are not damaged in the event a loose battery is dropped in the field. Briefly, therefore, there is provided herein an improved camera and battery alignment system for a camera.

FIGS. 1-6 illustrate a battery alignment system 10 that includes a housing 14 aligned with and releasably coupled to a battery 18. In the example shown, the housing 14 is a camera housing and the battery 18 is a camera battery. However, the battery alignment system 10 may be associated with other (e.g., non-camera) devices where a housing 14 and a battery 18 are releasably coupled to one another, and where it is desired to align the battery 18 with the housing 14 in a precise manner, and to inhibit damage to the battery 18 and/or the housing 14.

Figure 3:
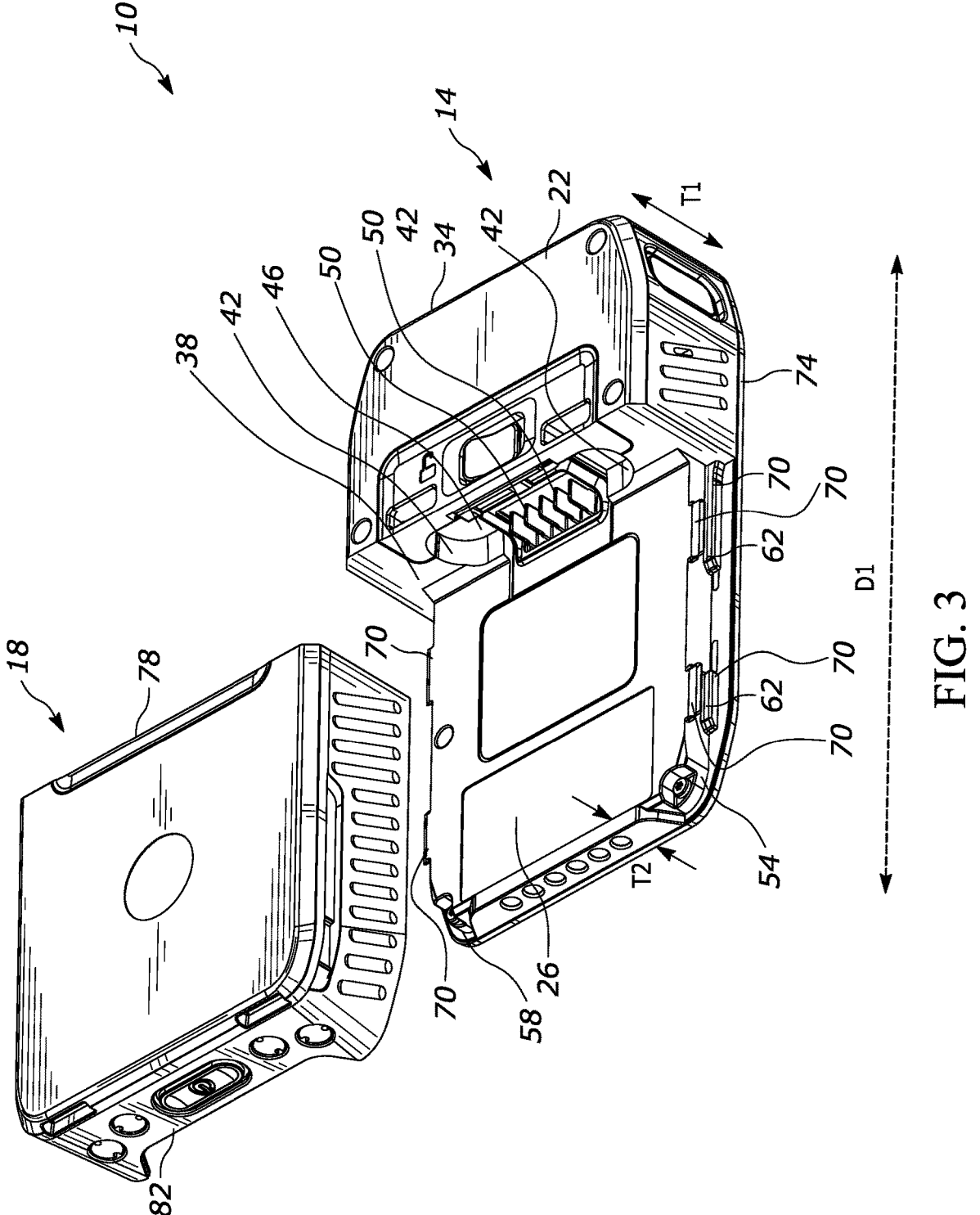
FIG. 3 is an exploded view of the camera, illustrating both a camera housing and a separate, removable battery.

With reference to FIG. 3, in the illustrated example, the housing 14 is a generally L-shaped housing (as viewed from a side of the housing 14) having a top portion 22 and a bottom portion 26 extending from the top portion 22 along a longitudinal direction D1. The top portion 22 has a thickness T1 (measured along a direction perpendicular to the longitudinal direction D1) and the bottom portion 26 has a thickness T2 that is less than the thickness T1. In some examples, and as illustrated in FIG. 1, the top portion 22 includes a camera lens 30.

Figure 4:
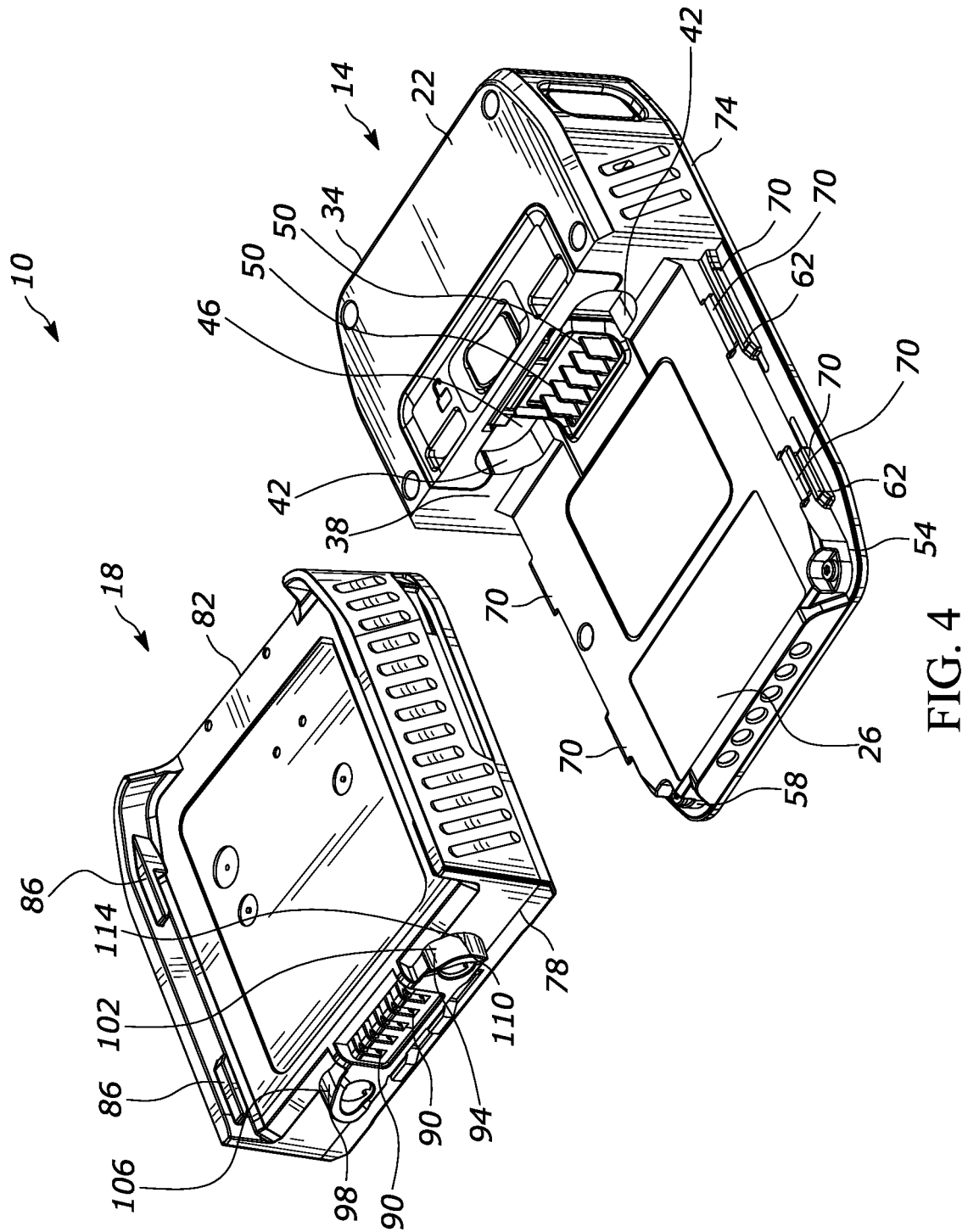
FIG. 4 is an exploded view of the camera, illustrating the battery flipped upside down as compared to the image in FIG. 3.

With reference to FIGS. 3 and 4, the top portion 22 of the housing 14 has a top end 34 and a bottom end 38 disposed opposite the top end 34 along the longitudinal direction D1. The bottom end 38 includes surfaces 42 (e.g., a first set of surfaces) that define at least one recess 46 along the bottom end 38. In the illustrated example, the surfaces 42 are spaced-apart, concave surfaces that extend along an exterior of the housing 14 upwardly along the longitudinal direction D1 to define an overall oval-shaped recess 46 as viewed looking up at the bottom end 38 along the longitudinal direction D1. Other examples may include surfaces 42 that define a recess 46 or recesses 46 having shapes other than oval shapes.

The top portion 22 of the housing 14 additionally includes electrical contacts 50 positioned at least partially within the recess 46 at the bottom end 38. The illustrated example includes five electrical contacts 50 positioned centrally between the concave surfaces 42 and at least partially within the recess 46, although other examples may include different numbers of electrical contacts 50 than that illustrated.

With continued reference to FIGS. 3 and 4, the bottom portion 26 of the housing 14 includes a first (e.g., lateral) side 54, and a second (e.g., lateral) side 58 disposed opposite the first side 54. A first side groove 62 (or grooves) is positioned along the first side 54, and a corresponding second side groove (not visible in FIGS. 3 and 4) is positioned along the second side 58. In the illustrated example, the first side groove 62 and the second side groove are each defined by a set of guide elements (e.g., ribs, rails, protuberances, etc.) 70 located along the first side 54 and the second side 58 of the bottom portion 26, respectively, and protruding laterally away from the housing 14.

As illustrated in FIGS. 3 and 4, the guide elements 70 project laterally away from the bottom portion 26 of the housing 14, and are spaced from one another such that spaces formed between the guide elements 70 define the first side groove 62 and the second side groove. Additionally, the guide elements 70 are spaced from one another and otherwise positioned along the bottom portion 26 of the housing 14 such that the first side groove 62 and the second side groove are each offset or otherwise spaced rearwardly from a front side 74 of the housing 14. In the illustrated example, each of the first side groove 62 and the second side groove is an elongate groove extending along the longitudinal direction D1 along a side of the housing 14. Other examples may include different numbers and arrangements of guide elements 70 and first and second side grooves than that illustrated.

With continued reference to FIGS. 3 and 4, the battery 18 includes a top end 78 and a bottom end 82 disposed opposite the top end 78 along the longitudinal direction D1. As illustrated in FIG. 4, the battery 18 includes tabs 86 (e.g., rails or other projections) positioned between the top end 78 and the bottom end 82, generally along opposite lateral sides of the battery 18 (one set of such tabs 86 along one side of the battery 18 being visible in FIG. 4). The tabs 86 project laterally inwardly and are sized and shaped to slide within the first side groove 62 and the second side groove, respectively, to facilitate alignment and coupling of the battery 18 to the housing 14. As illustrated in FIG. 4, at least one of the tabs 86 may have a generally L-shape. Other examples may include different sizes and shapes for the tabs 86, as well as other numbers of tabs 86 than that illustrated.

Figure 5:
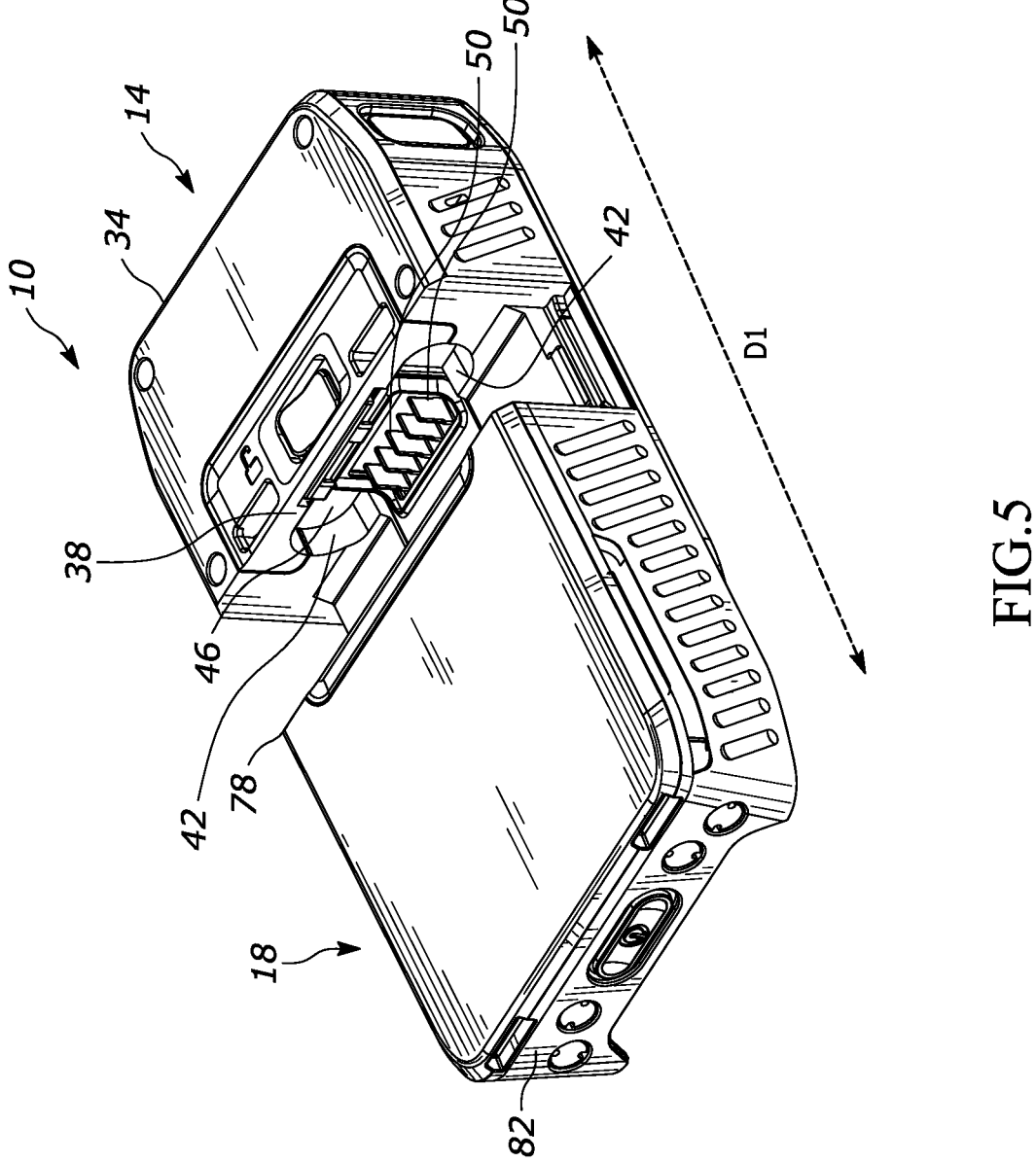
FIG. 5 is a perspective view of the camera, showing the battery being installed onto the camera housing.

Overall, the size, shape, and positioning of the guide elements 70 on the housing 14 and the tabs 86 on the battery 18 may be arranged such that only the battery 18 (or an identical version thereof) may be coupled to and slide onto the housing 14 as seen FIG. 5. In other words, a different battery (having tabs 86 for example at different locations) will not be able to slide within the first side groove 62 and the second side groove. This arrangement creates a "keyed" or "poka-yoke" arrangement, in which a battery that is not intended for the housing 14 cannot be aligned and coupled to the housing 14.

With reference to FIGS. 3 and 4, the top end 78 of the battery 18 includes electrical contacts 90. The illustrated example includes five electrical contacts 90 that are sized and shaped to mate with the five electrical contacts 50 on the battery 18, although other examples may include different numbers of electrical contacts 90 on the battery 18 than that illustrated.

The top end 78 also includes a first alignment post 94 and a second alignment post 98. The first alignment post 94 includes an outer (e.g., convex) surface 102 that protrudes from the top end 78 of the battery 18, and the second alignment post 98 includes an outer (e.g., convex) surface 106 that protrudes from the top end 78 of the battery 18. The outer surfaces 102, 106 define a second set of surfaces. The electrical contacts 90 are positioned between the first alignment post 94 and the second alignment post 98. The first and second alignment posts 94, 98 and are sized and shaped to fit within and slide into the recess 46 on the housing 14. The outer surfaces 102 and/or 106 may engage (e.g., slide against), or come in close proximity to, the surfaces 42 that define the recess 46, to help align the battery 18 with the housing 14. In the illustrated example, the first alignment post 94 and the second alignment post 98 are each a conical ear. Other examples may include other shapes and sizes of alignment posts 94, 98 than that illustrated.

The first and second alignment posts 94, 98 not only aid in facilitating alignment of the battery 18 with the housing 14 (e.g., with the recess 46 on the housing 14), but also serve to protect the battery 18 and the electrical contacts 90. For example, as illustrated in FIG. 4, the first and second alignment posts 94, 98 each extend past the electrical contacts 90, such that if the battery 18 is dropped, the electrical contacts 90 will be protected and will not contact the ground. Instead, the first and second alignment posts 94, 98 may withstand any forces from a drop of the battery 18.

Figure 6:
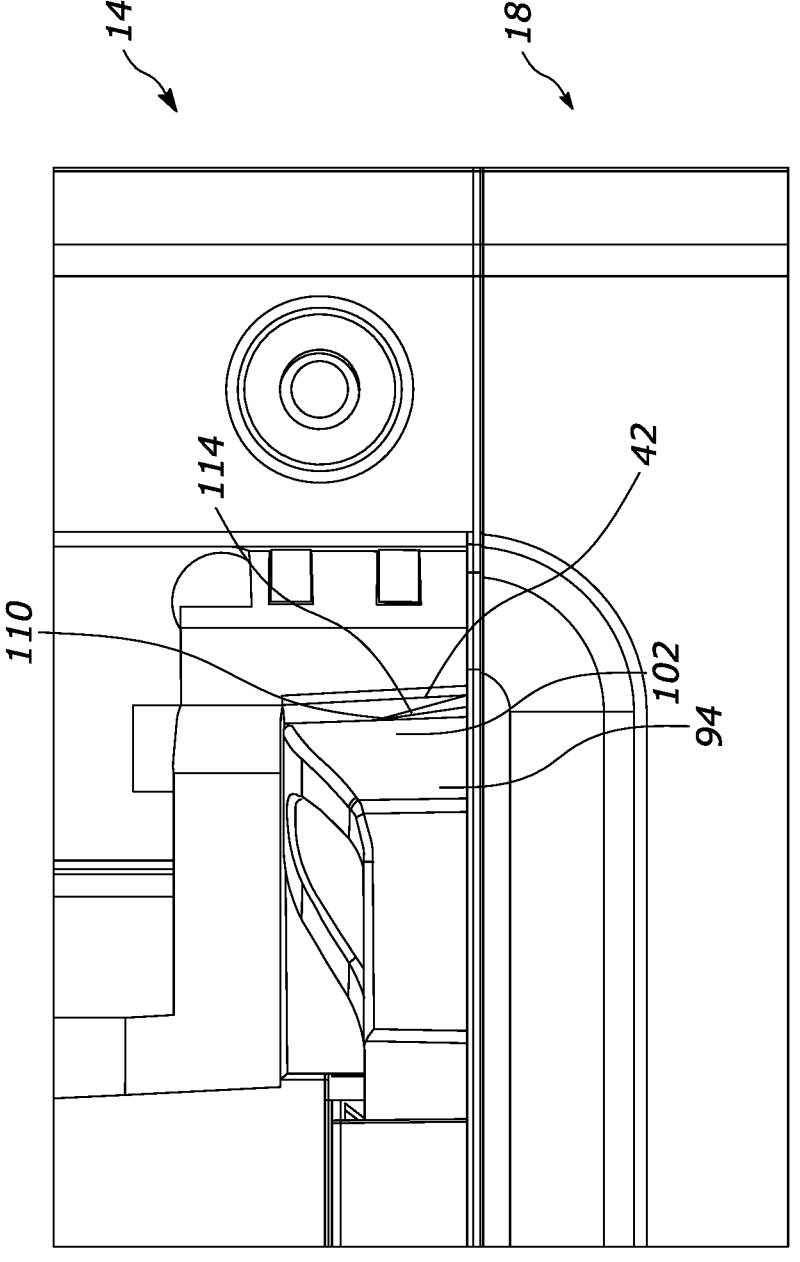
FIG. 6 is an enlarged, partial view of the battery after installation, illustrating a conical ear on the battery, and a wedge, both of which are used to facilitate alignment of the battery to the camera housing.
Figure 6:

With reference to FIGS. 4 and 6, in some examples the first alignment post 94 and/or the second alignment post 98 additionally includes a laterally-protruding wedge 110 (e.g., rib or other protrusion extending along a side of the alignment post 94). In the illustrated example, the wedge 110 defines an outer surface 114 (e.g., third surface) that is angled relative to the outer surface 102 of the first alignment post 94. The wedge 110 is sized and shaped such that when the battery 18 is coupled to the housing 14 and the first alignment post 94 extends into the recess 46 on the housing 14, the outer surface 114 of the wedge 110 engages and presses against one of the surfaces 42 on the housing 14. This engagement facilitates a more fine-tuned alignment of the battery 18 with the housing 14, and a more fine-tuned alignment of the electrical contacts 90 on the battery 18 with the electrical contacts 50 on the housing 14.

During use, and with reference to FIG. 5, the battery 18 is initially coupled to the housing 14 by first aligning the tabs 86 with the first side groove 62 and the second side groove, and sliding the battery 18 along the longitudinal direction D1. This results in a first alignment and coupling of the battery 18 to the housing 14.

The battery 18 is then moved farther along the longitudinal direction D1 until the first and second alignment posts 94, 98 align with and extend into the recess 46. This results in a second alignment and coupling of the battery 18 to the housing 14.

As the first and second alignment posts 94, 98 extend into the recess 46, the outer surface 114 of the wedge 110 contacts one of the surfaces 42 on the housing 14, thereby pushing and/or guiding the top end 78 of the battery 18, and more precisely aligning the electrical contacts 90 on the battery 18 with the electrical contacts 50 on the housing 14 until the electrical contacts 90 on the battery 18 engage with the electrical contacts 50 on the housing 14. This results in a third alignment and coupling of the battery 18 to the housing 14.

In some examples, the second alignment and coupling is a more precise alignment and coupling than the first alignment and coupling, and the third alignment and coupling is a more precise alignment and coupling than the second alignment and coupling.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A battery alignment system comprising:
   a housing having
      a groove along a side of the housing,
      a first set of surfaces that define a recess within the housing, and
      a plurality of first electrical contacts positioned at least partially within the recess; and
   a battery having
      a tab sized and shaped to slide within the groove of the housing to facilitate a first alignment and coupling of the battery to the housing,
      a second set of surfaces that protrude from an end of the battery and are sized and shaped to slide into the recess of the housing to facilitate a second alignment and coupling of the battery to the housing, wherein the second set of surfaces define a first outer surface and a second outer surface,
      a plurality of second electrical contacts sized and shaped to engage the plurality of first electrical contacts, and
      a wedge protruding laterally away from the first outer surface, wherein the wedge includes a third surface that is angled relative to the first outer surface, wherein the wedge is sized and shaped such that when the battery is coupled to the housing and the second set of surfaces extend into the recess on the housing, the third surface on the wedge engages and presses against one of the first set of surfaces that define the recess, to facilitate alignment of the plurality of second electrical contacts on the battery with the plurality of first electrical contacts on the housing.

2. The battery alignment system of claim 1, wherein the housing includes a first guide element protruding laterally along the side of the housing and a second guide element protruding laterally along the side of the housing, wherein the groove is defined by a space formed between the first guide element and the second guide element.

3. The battery alignment system of claim 1, wherein the groove is a first side groove and the tab is a first tab, wherein the housing includes a second side groove along an opposite side of the housing, wherein the first side groove faces laterally outwardly in a first direction along the side of the housing, and the second side groove faces laterally outwardly in a second direction along the opposite side of the housing, wherein the first direction is opposite to the first direction, and wherein the battery includes a second tab that is sized and shaped to slide within the second side groove to facilitate the first alignment and coupling of the battery to the housing.

4. The battery alignment system of claim 1, wherein the recess has an oval shape.

5. The battery alignment system of claim 1, wherein the groove is an elongate groove extending along a longitudinal direction along the side of the housing, and wherein the first set of surfaces extend along the longitudinal direction.

6. The battery alignment system of claim 1, wherein the first set of surfaces includes a first concave surface along an exterior of the housing, and a second concave surface along an exterior of the housing.

7. The battery alignment system of claim 6, wherein the first concave surface is spaced from the second concave surface.

8. The battery alignment system of claim 7, wherein the plurality of first electrical contacts are positioned between the first concave surface and the second concave surface.

9. The battery alignment system of claim 1, wherein the tab has an L-shape when viewed from a side of the battery.

10. The battery alignment system of claim 1, wherein the tab is a first tab, wherein the battery includes a second tab having a shape different than the first tab.

11. The battery alignment system of claim 1, wherein the first outer surface is a first convex surface and the second outer surface is a second convex surface.

12. The battery alignment system of claim 11, wherein the first convex surface is spaced from the second convex surface.

13. The battery alignment system of claim 12, wherein the plurality of second electrical contacts are positioned between the first convex surface and the second convex surface.

14. The battery alignment system of claim 11, wherein the first convex surface defines a first conical ear extending from the end of the battery, wherein the second convex surface defines a second conical ear extending from the end of the battery.

15. The battery alignment system of claim 1, wherein the tab extends along a longitudinal direction along a side of the battery, and wherein the second set of surfaces extend along the longitudinal direction.

16. The battery alignment system of claim 1, wherein the first outer surface forms part of a first alignment post and the second outer surface forms part of a second alignment post, wherein the first alignment post and the second alignment post each extend axially past the plurality of second electrical contacts.

17. The battery alignment system of claim 1, wherein the recess has an oval shape, and wherein the second set of surfaces define first and second conical ears sized and shaped to fit within the oval shaped recess.

\* \* \* \* \*